(12) United States Patent
Waissi et al.

(10) Patent No.: US 8,875,673 B2
(45) Date of Patent: *Nov. 4, 2014

(54) CRANKDISK BEARING SUPPORT FOR THE WAISSI INTERNAL COMBUSTION ENGINE

(71) Applicants: Gary Ray Robert Waissi, Phoenix, AZ (US); Robert Waissi, Ann Arbor, MI (US)

(72) Inventors: Gary Ray Robert Waissi, Phoenix, AZ (US); Robert Waissi, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/742,318

(22) Filed: Jan. 15, 2013

(65) Prior Publication Data

US 2014/0196675 A1    Jul. 17, 2014

Related U.S. Application Data

(63) Continuation-in-part of application No. 12/943,898, filed on Nov. 10, 2010, now abandoned.

(51) Int. Cl.
| | |
|---|---|
| *F02B 75/22* | (2006.01) |
| *F02B 75/00* | (2006.01) |
| *F01B 9/06* | (2006.01) |
| *F02B 75/24* | (2006.01) |
| *F02B 75/32* | (2006.01) |
| *F16C 33/10* | (2006.01) |
| *F01M 9/06* | (2006.01) |

(52) U.S. Cl.
CPC ............... *F02B 75/002* (2013.01); *F01B 9/06* (2013.01); *F02B 75/24* (2013.01); *F02B 75/32* (2013.01); *F16C 33/10* (2013.01); *F01M 9/06* (2013.01)
USPC ................. 123/55.2; 123/52.1; 74/48; 384/11

(58) Field of Classification Search
CPC ........ F02B 75/24; F02B 75/32; F02B 75/246; F04B 27/02
USPC ......... 123/55.2, 52.1, 55.5; 74/48–51, 54, 55; 384/11, 50
See application file for complete search history.

(56) References Cited

U.S. PATENT DOCUMENTS

| | | | | |
|---|---|---|---|---|
| 1,663,186 | A | * | 3/1928 | Anderson .................... 475/99 |
| 2,600,032 | A | * | 6/1952 | Tyler .......................... 73/247 |
| 5,402,755 | A | | 4/1995 | Waissi |
| 8,109,244 | B1 | | 2/2012 | Waissi |
| 2008/0289488 | A1 | * | 11/2008 | Raffaele et al. ................ 92/72 |

OTHER PUBLICATIONS

Waissi, Gary R., Internal Combustion (IC) Engine with Minimum Number of Moving Parts, Paper No. 950090, Futuristic Concepts in Engines and Components, 1995, pp. 61-64, SAE SP-1108. Published by SAE, United States.

* cited by examiner

*Primary Examiner* — Noah Kamen
*Assistant Examiner* — Long T Tran

(57) ABSTRACT

An improvement to the Waissi type opposed piston internal combustion engine is proposed. The engine has at least one pair of aligned and opposed cylinders with one reciprocating double-headed piston assembly in each cylinder pair. The reciprocating motion of the piston is transmitted to the driveshaft by a rotating crankdisk, which is off-centered mounted to the driveshaft. The high friction metal to metal contact between the crankdisk and the piston contact wall is replaced by a combination of a roll resistance and friction under hydrodynamic conditions resulting to a significantly reduced total resistance between the piston and the crankdisk. This is accomplished by utilizing a bearing ring assembly slidably installed on the annular perimeter surface of the crankdisk. The bearing ring is held in place by a linear U-profile groove, which is casted or machined on each the piston contact slot wall of the integrated piston assembly respectively.

2 Claims, 4 Drawing Sheets

FIG. 2c
FIG. 2c-1
K - K
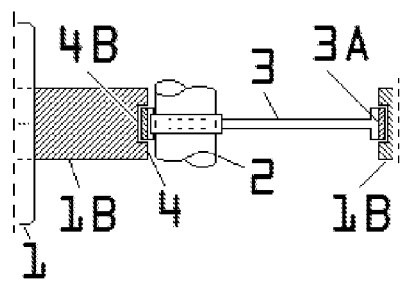
FIG. 2c-2
K - K
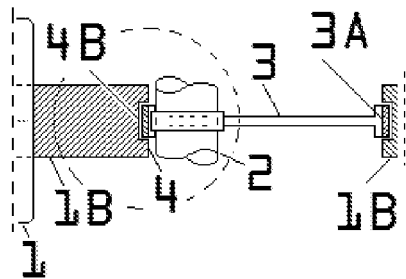
FIG. 2c-3
L - L
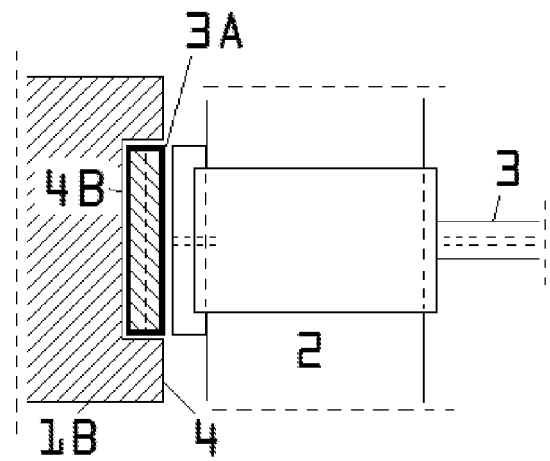

CRANKDISK BEARING SUPPORT FOR THE WAISSI INTERNAL COMBUSTION ENGINE

CROSS-REFERENCE TO RELATED APPLICATIONS

Continuation-In-Part of application Ser. No. 12/943,898 of Nov. 10, 2010.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

CROSS-REFERENCE TO RELATED PATENTS

U.S. Pat. No. 8,109,244 B1 of Feb. 7, 2012
U.S. Pat. No. 5,402,755 of Apr. 4, 1995.

REFERENCES CITED

U.S. PATENT DOCUMENTS

| | | | |
|---|---|---|---|
| 8,109,244 B1 | February 2012 | Waissi | 123/55.3; 123/197.4 |
| 5,402,755 | April 1995 | Waissi | 123/55 |

JOURNAL ARTICLES

Waissi, Gary R., Internal Combustion (IC) Engine with Minimum Number of Moving Parts, Paper No. 950090, Futuristic Concepts in Engines and Components, SAE SP-1108, pp. 61-64, (1995).

FIELD OF THE INVENTION

This invention relates to an internal combustion (IC) engine, and more particularly to the prior art reciprocating IC engine with opposed and aligned cylinders proposed by Waissi, U.S. Pat. Nos. 8,109,244 B1 and U.S. Pat. No. 5,402,755, and as disclosed in SAE SP-1108 paper No. 950090.

BACKGROUND OF THE INVENTION

The prior art engine (U.S. Pat. Nos. 8,109,244 B1 and U.S. Pat. No. 5,402,755), proposed by Waissi, is an internal combustion engine with opposed and aligned cylinders, called here the Waissi Engine. The Waissi Engine consists of at least one pair of aligned and opposed cylinders wherein a reciprocating double-headed piston is slidably mounted, and in which the double-headed piston axis intersects perpendicularly with the axis of a driveshaft. The reciprocating motion of the double-headed piston is transmitted to the driveshaft by a rotating crankdisk. The crankdisk is rigidly and off-centered mounted to the driveshaft, which is rotably mounted to a crankcase. The crankdisk outer perimeter forms a circle. The double-headed piston has two slots perpendicularly through its axis, one of which is to allow for a rotating movement of the crankdisk, and the other, to allow for the rotation of the driveshaft. The prior art further discloses that the double headed piston may be assembled from multiple components or parts, which form an integrated, rigid, piston structure.

In conventional prior art engines (V-, in-line, opposed) the metal to metal contact between the piston connecting-rod big-end and the crankshaft is avoided by creating hydrodynamic lubrication conditions in an oil film of the connecting-rod to crankshaft bearing. It is therefore, and in order to reduce friction and wear, highly desirable to create similar hydrodynamic lubrication conditions in the piston to crankdisk contact surface of the Waissi Engine, and, in particular, to provide for crankdisk rotation under hydrodynamic conditions.

The prior art improvement (SAE SP-1108, Paper No. 950090, Futuristic Concepts in Engines and Components, pp. 61-64, (1995)) to the Waissi Engine propose to reduce friction between the crankdisk annular bearing surface and piston internal bearing surfaces by a special bearing ring. Within this improvement the outer perimeter surface of the crankdisk acts as a bearing and slides inside the bearing ring. The crankdisk has a diameter and annular perimeter design that fits tightly but slidably inside the bearing ring. The bearing ring, with a diameter that fits in-between the piston slot bearing surfaces (or inside the piston slot), is intended to roll or slide on the piston slot bearing surface. The crankdisk perimeter and surface design correspond the conventional engine crankshaft—piston rod journal design to provide for hydrodynamic lubrication.

The prior art (U.S. Pat. No. 8,109,244 B1) improvement discloses specific designs for the crankdisk and bearing ring to provide for assembly as well as for holding the bearing ring in its designed location when the crankdisk rotates. The bearing ring is installed on the crankdisk to provide for hydrodynamic lubrication conditions between the crankdisk and the bearing ring, and for oil-splash lubrication between the bearing ring and the piston slot surface.

The prior art (U.S. Pat. No. 8,109,244 B1) discloses two specific distinct designs for the crankdisk-bearing combination. One of the designs consists of a machined or casted groove or depression on the crankdisk outer annular surface, in which one or both of the flanges or sides of the groove of the crankdisk are removable to allow for a flat I-profile bearing ring installation such that the bearing ring fits tightly but slidably in-between the flanges of the crankdisk annular bearing surface. The second, or alternative, design consists of a machined or casted groove on the inside surface of the bearing ring, forming a U-profile with flanges facing toward the center of the bearing ring, in which one or both of the flanges or sides of the groove are removable to allow for the U-profile bearing ring installation such that the crankdisk bearing surface fits tightly but slidably in-between the bearing ring flanges. Both designs propose modifications in form of casting or machining a U-profile on either the inside surface of the bearing ring or the annular outside surface of the crankdisk with one or both flanges or sides removable respectively. Both proposed designs provide for assembly as well as for holding the bearing ring in its designed location when the crankdisk rotates. Both proposed designs also provide for hydrodynamic lubrication condition between the crankdisk annular bearing surface and the bearing ring.

However, as summarized above, the prior art proposes only a bearing ring—crankdisk combination design that will require machining or casting a groove or depression on either the inside surface of the bearing ring or the outer annular surface of the crankdisk with one or both groove flanges removable to provide for assembly, as well as to hold the bearing ring in its designed place when the crankdisk rotates. The prior art proposed solution includes also an alternative utilization of roller- or ball bearings instead of a bearing ring. However, roller-, ball and other direct contact (metal-to-metal, or other direct solid material contact) bearings are not the subject of this invention.

BRIEF SUMMARY OF THE INVENTION

A main object of the present invention is to provide an improvement to the Waissi Engine, which significantly simplifies the manufacture, assembly and installation of the prior art bearing ring, crankdisk and integrated piston assembly without affecting the operational hydrodynamic lubrication condition between the bearing ring and the annular outer surface of the crankdisk. The invention comprises the features hereinafter described and particularly pointed out in the claims. The following description and the attached drawings set forth in detail certain illustrative, however indicative, embodiment of the invention, of but a few ways in which the principles of the invention may be employed.

The main object of this invention is accomplished by a U-profile groove machined or cast on the piston slot wall surface. The integrated double headed piston structure has two piston slot walls located opposite to each other for the crankdisk. This invention is accomplished by machining or casting grooves on both piston head slot walls of the integrated double headed piston hold the bearing ring in place when the crankdisk rotates. Installation and assembly of the crankdisk-, bearing ring-, piston assembly do not require removable groove flanges or sides, because the U-profile groove on the piston slot wall is linear. Within this arrangement a flat I-profile bearing ring, in which the surface of the base of the bearing ring is flat and smooth, corresponding to prior art bearing surface design, on both sides and parallel to the crankdisk bearing surface, is used. The bearing ring is manufactured as one piece without a groove for assembly or a removable flange. Similarly the crankdisk is manufactured without a groove for assembly or a removable flange. Within the proposed design the outer perimeter of the flat, I-profile, bearing ring fits tightly, but is allowed to slide or roll, in the U-profile groove machined or cast on the piston slot wall. Within the proposed design, also, the flat I-profile inner perimeter of the bearing ring fits tightly but slidably on the crankdisk, and slides under hydrodynamic conditions on the crankdisk annular perimeter surface. There is neither a groove nor flanges required on the crankdisk to hold the bearing ring or to provide for assembly. And also, there is neither a groove nor flanges required on the crankdisk to hold the bearing or to provide for assembly.

BRIEF DESCRIPTION OF THE SEVERAL VIEWS OF THE DRAWINGS

The main object, features and advantages of this invention will become apparent from a consideration of the following description, the appended claims and the accompanying drawings in which:

FIG. 2a also identifies the piston mantel 1, piston support structure 1B, piston slot wall 4, and the machined or casted groove or depression 4B on the piston slot wall 4. Other parts and components are not shown for clarity.

FIG. 2c is presented as three related figures: FIG. 2c-1, FIG. 2c-2, and FIG. 2c-3. FIG. 2c-1 shows the top-view section K-K of FIG. 2a, FIG. 2c-2 shows the same top-view section K-K and includes a dashed circle. The dashed circle represents the top-view section L-L of FIG. 2a. Section L-L is shown enlarged in FIG. 2c-3. Other parts and components are not shown for clarity (including shaft counterbalances, and piston head connecting members 4A, see FIG. 1).

FIG. 2c-1 shows the top-view section K-K of FIG. 2a. This figure shows the piston mantel 1, piston support structure 1B, the piston slot wall 4, and the machined or casted groove or depression 4B. The figure also shows the driveshaft 2, crankdisk 3, and the bearing ring 3A. The bearing ring 3A fits tightly but slidably into the groove 4B. The flanges of groove 4B hold the bearing ring 3A in its designed location when the crankdisk rotates. There are no grooves or flanges on the bearing ring 3A or the crankdisk 3 bearing surface for the purpose of holding the bearing ring 3A in its designed place when the crankdisk rotates. It should be noted, that if a groove is created for the purpose of oil distribution either on the bearing ring or the crankdisk bearing surface, then that does not constitute a different invention. The detail is further shown in FIG. 2c-3 with an enlarged top view—section L-L.

DETAILED DESCRIPTION OF THE INVENTION

Figure 1:
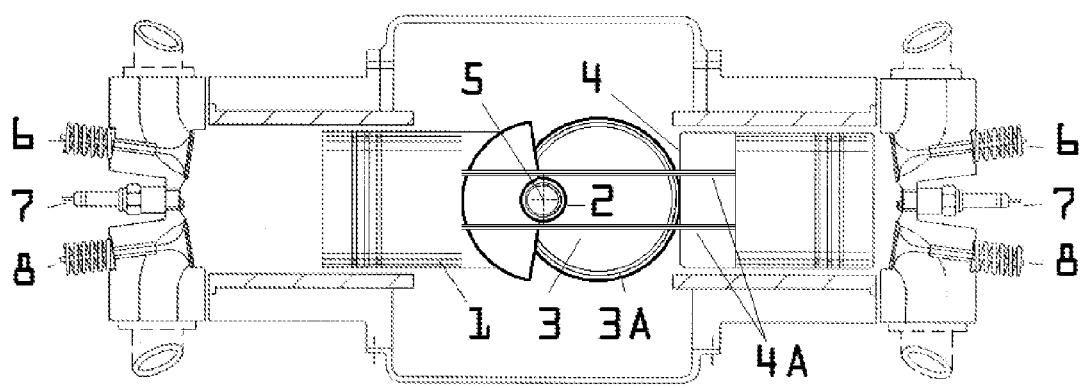
FIG. 1 (adapted from U.S. Pat. Nos. 8,109,244 B1, 5,402,755 and from SAE SP-1108, Paper No. 950090, Futuristic Concepts in Engines and Components, pp. 61-64, (1995)) is a section view of the Waissi Engine, in which a double-headed piston 1 reciprocates, perpendicularly to a driveshaft 2, in aligned and horizontally opposed cylinders. The rigid double-headed piston assembly consists of two piston heads attached to each other by four connecting members 4A (two of those are shown in FIG. 1). These four connecting members can be, for example, bolts. It is noted that at least one connecting member is required between the piston heads to integrate the two piston heads into one piston structure. Therefore, a different number of connecting members between the piston heads, that accomplish the same objective of creating an integrated piston structure, does not create a different invention. The connecting members provide two slots perpendicularly through the axis of the pistons, one of which is to allow for a rotating movement of the crankdisk 3 and the bearing ring 3A combination, and the other slot, to allow for the rotation of the driveshaft 2. The crankdisk 3 bearing ring piston slot wall contact surface is identified as 4 in FIG. 1. Other parts and components are not shown for clarity.

In FIG. 1 (adapted from U.S. Pat. Nos. 8,109,244 B1, 5,402,755 and from SAE SP-1108, Paper No. 950090, Futuristic Concepts in Engines and Components, pp. 61-64, (1995)) the double-headed piston 1 reciprocates, perpendicularly to the driveshaft 2, in the aligned and horizontally opposed cylinders. The driveshaft 2 is rotably mounted to the crankcase. The center axis 5 of the driveshaft is the center of rotation of the driveshaft. The crankdisk 3 is off-centered attached to the driveshaft 2. The crankdisk 3 is located at the piston axis.

The outer perimeter surface of the crankdisk 3 acts as a bearing and slides under hydrodynamic conditions inside a bearing ring 3A, which rolls or slides inside the groove 4B which is machined or casted on the piston slot wall 4. The piston slot 4 is axially provided through the piston 1 to allow for the rotation of the crankdisk 3. Hydrodynamic conditions are created by oil being pumped under pressure through channels or cavities provided through the crankdisk connecting the center of the driveshaft oil supply to the outer perimeter bearing surface of the crankdisk.

To force rolling of the bearing ring inside the groove 4B provided on the surface of the piston slot wall 4 the outer perimeter surface of the bearing ring 3A, and the piston slot wall groove 4B, may be provided with appropriate toothing or gear. This, forced rolling of the bearing ring via toothing or gear, however, is not necessary, does not provide for additional benefits, and does not constitute a different invention.

The crankdisk 3 has a diameter that fits tightly but slidably inside the bearing ring 3A, which fits tightly between the piston bearing surfaces inside the piston slot wall grooves. The crankdisk 3 has a perimeter design, known from the prior art, that provides for hydrodynamic lubrication conditions between the crankdisk 3 and the bearing ring 3A. The piston slot length and groove length are such that they will accommodate the crankdisk 3 and the bearing ring 3A including an acceptable tolerance known from the prior art.

Figure 2A:
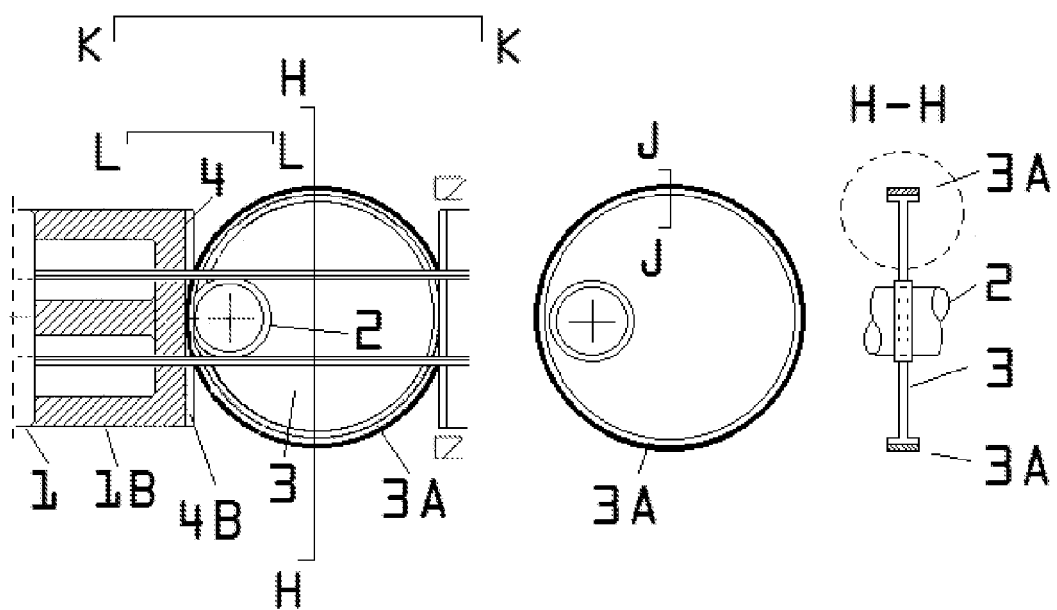
FIG. 2a shows the center section of the engine of FIG. 1, then separately and for clarity the bearing ring 3A only, as well as the cross section H-H of the crankdisk 3—bearing ring 3A—drivehaft 2 assembly.
Figure 2B:
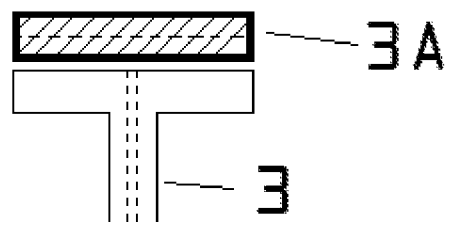
FIG. 2b shows an enlarged section J-J of FIG. 2a (the lower end of the bearing ring—crankdisk assembly is not shown for clarity). It is noted, that FIG. 2b shows no machined or casted grooves to laterally support the bearing ring 3A in order to hold the bearing ring in its place when the crankdisk rotates.

In the preferred embodiment a flat, I-profile, bearing ring in installed on the crankdisk as shown in FIG. 2a and FIG. 2b. FIG. 2b also shows that there are no means of holding, grooves or flanges on, the bearing or the crankdisk bearing surface for the purpose of keeping the bearing ring in its position when the crankdisk rotates. The means of holding the bearing ring in its designed position is accomplished by a groove or depression on the surface of the piston slot wall, shown in FIG. 2c; FIG. 2c-1, FIG. 2c-2, FIG. 2c-3.

The proposed design has the following benefits when compared to the prior art (U.S. Pat. No. 8,109,244 B1) design: fewer parts, simpler design, simpler manufacturing and easier assembly. In the proposed design the piston slot wall groove is linear, which does not require removable sides or flanges. The prior art solutions requires a removable annular (circle or ring) flange or side on the bearing ring or the crankdisk to allow for bearing ring—crankdisk combination assembly. The prior art removable, annular, flanges or sides require additional means or mechanisms for attachment. The proposed design, with fewer and simpler parts to be manufactured and assembled, accomplishes both the same hydrodynamic lubrication objective between the crankdisk and the bearing ring, and the holding of the bearing ring in its designed position as the prior art solution.

Without loss of generality, different angles of the U-profile sides (or flanges) on the piston slot wall groove, or different side- or flange designs (for example grooves, depressions, or notches added to the flanges) either as part of the bearing ring, the crankdisk or the piston slot wall do not change the bearing ring function, and, therefore, do not constitute a different invention.

For clarity and simplicity, significant engine parts are shown in FIG. 1, FIG. 2a, FIG. 2b, and FIG. 2c only.

Further, it is appreciated from the FIG. 1, FIG. 2a, FIG. 2b, and FIG. 2c, and the above description, summarily that according to the present invention, since the crankdisk 3 slides under hydrodynamic conditions inside the bearing ring 3A, which rolls or slides in the piston slot wall 4 groove 4B, metal to metal high friction contact between the crankdisk and the piston slot wall is avoided with the proposed improvements. While a bearing ring and two specific designs have been proposed in the referenced prior art, the specific design and requirements as presented above and in FIG. 2a, FIG. 2b and FIG. 2c have not been proposed for the Waissi Engine. The proposed design of the bearing ring and bearing ring assembly, with respect to assembly of the crankdisk—bearing ring—integrated piston assembly combination, function of the bearing in terms of the bearing ring staying in its designed position when the crankdisk rotates, summarily constitute a significant difference from the prior art for the Waissi Engine.

A bearing ring 3A substitution or replacement by other types of bearings or bearing rings which accomplish the same function do not constitute a different invention. With respect to assembly, bearing weight, dynamic engine balance, wear and tear, cost of bearings, and total cost of engine manufacture, the proposed solutions appear to be the simplest, most durable, and most cost effective.

A further preferred embodiment, and an improvement, comprises of providing for a laterally non-rigid connection between the crankdisk 3 and the driveshaft 2, see FIG. 1, by installing the crankdisk on the driveshaft in such a way that a small lateral movement for the crankdisk on the driveshaft is allowed. This is accomplished providing (by machining or casting) one or more longitudinal grooves (or teeth) on the driveshaft and matching grooves (or teeth) on the off-centered crankdisk hole, and by providing a positive tolerance for installation known from the prior art, to allow for installation and assembly of the crankdisk on the driveshaft. The benefit of this improvement, allowing a small lateral movement for the crankdisk on the driveshaft, is assembly and fitting of low tolerance components and parts, in particular, the integrated piston assembly and cylinders of the Waissi engine.

What is claimed is:

1. An improved internal combustion engine, comprising: a driveshaft and means mounting the driveshaft for rotation about an axis; at least one pair of aligned and opposed cylinders; at least one double-headed piston, having at least one rigid connection between the piston heads, reciprocating in said pair of cylinders; a circular crankdisk, for each said piston respectively, installed on said driveshaft; the said crankdisk having an outer annular surface formed about a center that is laterally offset from the center of rotation of the said driveshaft, and rigidly attached to the said driveshaft; the said piston body having a first slot, a second slot perpendicular to the first slot, each of said slots being perpendicular to the axis of the driveshaft and the crankdisk, the first slot being perpendicular to the piston axis and allowing the rotating movement of the driveshaft, and the second slot allowing the rotating movement of the crankdisk; a flat I-profile bearing ring, mounted on the annular surface of the said crankdisk, which engages slidably under hydrodynamic conditions the annular surface of the said crankdisk, and rolls or slides against the inside walls of the said second slot provided axially through the double-headed piston;

wherein the improvement comprises of a linear U-profile groove or depression on the said second slot surface of the piston within which said bearing ring slides or rolls;

wherein the said linear U-profile groove or depression sides or flanges on the said second slot wall of the piston, fit tightly but slidably on the said bearing ring, and keep the bearing in its designed place when the crankdisk rotates;

whereby the said crankdisk with the aid of the said bearing ring transmits the piston force of the double-headed piston to the driveshaft and causes the driveshaft to rotate about its axis.

2. An improved internal combustion engine, comprising: a driveshaft and means mounting the driveshaft for rotation about an axis; at least one pair of aligned and opposed cylinders; at least one integrated double-headed piston, having at least one rigid connection between the piston heads, reciprocating in said pair of cylinders; a circular crankdisk, for each said integrated piston respectively, installed on said driveshaft; the said crankdisk having an outer annular surface formed about a center that is laterally offset from the center of rotation of the said driveshaft, and rigidly attached to the said driveshaft; the said piston body having a first slot, a second slot perpendicular to the first slot, each of said slots being perpendicular to the axis of the driveshaft and the crankdisk, the first slot being perpendicular to the piston axis and allowing the rotating movement of the driveshaft, and the second slot allowing the rotating movement of the crankdisk; a flat I-profile bearing ring, mounted on the annular surface of the said crankdisk, which engages slidably under hydrodynamic conditions the annular surface of the said crankdisk, and rolls or slides against the inside walls of the said second slot provided axially through the integrated double-headed piston;

wherein the improvement comprises of the said off-centered crankdisk installed on the said driveshaft utilizing one or more longitudinal grooves (or teeth) on the driveshaft and matching grooves (or teeth) on the off-centered crankdisk hole provided for installation of the crankdisk on the driveshaft;

wherein the said crankdisk to driveshaft connection is non-rigid, and allows for small lateral movement of the crankdisk on the driveshaft for installation and assembly of the integrated piston structure.

* * * * *